May 30, 1961 M. ISAACSON 2,986,665

ELECTRIC MOTOR

Filed Jan. 17, 1957

INVENTOR.
MAX ISAACSON

BY Milton E. Gilbert

ATTORNEY

United States Patent Office 2,986,665
Patented May 30, 1961

2,986,665

ELECTRIC MOTOR

Max Isaacson, Dayton, Ohio, assignor to Globe Industries, Inc., a corporation of Ohio Filed Jan. 17, 1957, Ser. No. 634,723

7 Claims. (Cl. 310—154)

This invention pertains to an electric motor utilizing either permanent or electromagnets and the method of producing the same.

In the Robert A. Stein copending application Serial No. 471,560, now Patent No. 2,935,785, there is disclosed a method of manufacturing a stator for an electric motor of the permanent magnet type. In the Stein application the pole pieces are all parallel to each other and parallel to the axis of rotation of the armature.

It is quite desirable to have an askew relationship between the armature slots and the pole faces of an electric motor. In a small electric motor, it has been found much easier to wind the rotor or armature when the slots are parallel to the axis of rotation of the armature. Furthermore, in order to obtain the desired askew relationship, it may be necessary in some cases to arrange the poles in askew relationship and the armature slots in askew relationship, but in the opposite direction, so as to obtain the proper angular displacement of the poles with respect to the armature slots.

By arranging the poles and the armature slots in an askew relation to each other, the magnetic drag is reduced, and a steadier pull is applied to the armature or rotor, in that pulsations are reduced. Furthermore, it has been found that a smaller current is required to start the motor when there is an askew relationship between the armature slots and the poles. In other words, for a given current, the starting torque is greater when this askew relationship exists. It is also advantageous as far as the commutation is concerned to have this askew relationship.

In producing small electric motors of the permanent magnet type, it is quite desirable that the ends of the permanent magnet contact the pole engaging facets of stationary pole members in planes parallel to the axis of rotation of the rotor. That being the case, it has not been found practical to askew the entire pole pieces and the contacting surfaces between the poles and the permanent magnets, in that any misfit or misalignment of the ends of the permanent magnets with respect to the contacting surfaces of the poles greatly reduces the efficiency of the motor, for the reason that the reluctance is greatly increased.

An object of this invention is to provide an electric motor wherein the contacting surfaces between the permanent magnets and the magnet contacting surfaces of the poles extend in planes parallel to the axis of rotation of the rotor and wherein the pole pieces overlying the armature or rotor is angularly displaced with respect to the axis of rotation of the armature, so as to obtain an askew pole piece but, at the same time, maintain contact between the poles and the permanent magnets in planes parallel to the axis of rotation of the rotor. This has been accomplished by the use of the angularly displaced channels or rabbets tapering as to depth and located between the portion of the pole that is in contact with the permanent magnets and the pole face adjacent the armature or rotor.

As is disclosed in the aforementioned Stein application, non-magnetic material is cast on the ends of the two poles, which poles are held in fixed spaced relation. In addition to the Stein disclosure, the tapering channels or rabbets are filled with a non-magnetic material, so that when machining the pole faces, the cutting tool passes from one type of material to another type along the margins of the askew portions forming the pole faces of the pole pieces, thereby eliminating burrs being formed along the margins of the pole pieces.

Another object of this invention is to provide pole pieces that may be made from powdered metal, wherein each pole piece may be made in two parts, each part being made in the same mold cavity, so that when juxtaposed upon each other, the proper askew relationship is obtained by the use of a comparatively simple mold used in forming the powdered metal.

Another object of this invention is to provide a four pole stator, wherein the pole pieces are askew with respect to each other and wherein one pair of pole pieces are made from two pieces juxtaposed upon each other and the other pair of pole pieces are made from two pieces juxtaposed upon each other, this being followed by casting non-magnetic material on the ends of the pole pieces arranged in quadrature, so as to firmly hold the pole pieces in fixed position, the pieces used in forming the pole pieces including portions forming facets adapted to be in contact with the ends of the permanent magnets, which facets lie in planes parallel to the axis of rotation of the armature. The faces of the pole pieces that are located adjacent the armature are provided with diagonally disposed rabbets, to thereby present an askew pole face adjacent the rotor or armature.

Other objects and advantages reside in the construction of parts, the combination thereof, the method of manufacturing and the mode of operation, as will become more apparent from the following description.

Referring to the drawings, Figure 1 is an end view of a magnetic bar having the ends cast in non-magnetic material.

Figure 5:
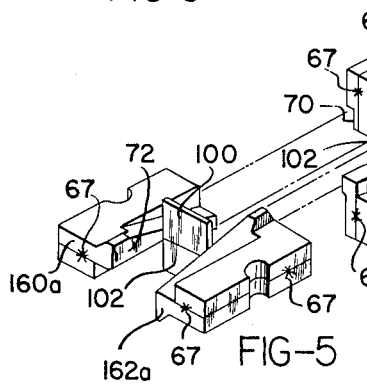

Figure 5 discloses pole pieces that are made from powdered metal, each pair of pole pieces being made from two identical pieces juxtaposed upon each other.

Figure 6:
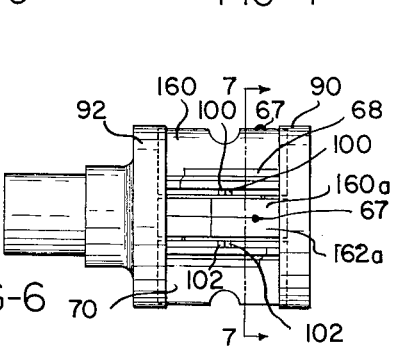

Figure 6 is a side elevational view of the pole pieces disclosed in Figure 5 after having been assembled and having non-magnetic material cast on the ends throughout the core.

Figure 7:
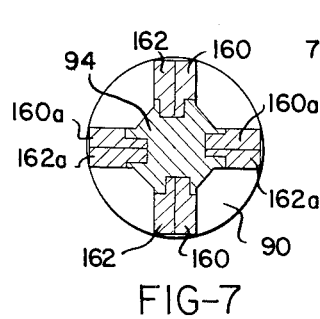

Figure 7 is a cross sectional view, taken substantially on the line 7—7 of Figure 6.

Figures 8, 10:
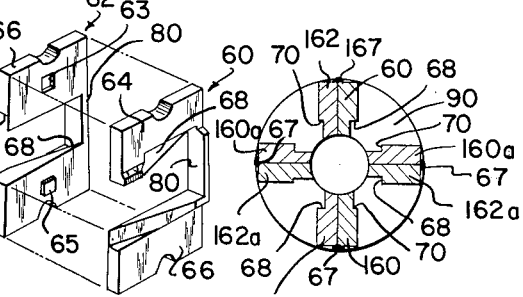

Figure 8 discloses a pair of pieces that, when juxtaposed upon each other, form a single pair of poles.

Figures 3, 4, 9:
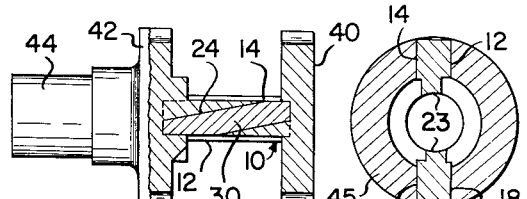
Figure 3 is a cross sectional view, taken substantially on either section line 3—3 of Figure 2.
Figure 4 is a cross sectional view, taken substantially on the line 4—4 of Figure 2.

Figure 9 is a transverse cross sectional view of a finished stator having two poles and the permanent magnets.

Figure 10 is a transverse cross sectional view of a finished stator having four poles made from powdered metal.

Figure 1:
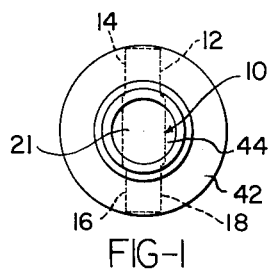
Figure 2:
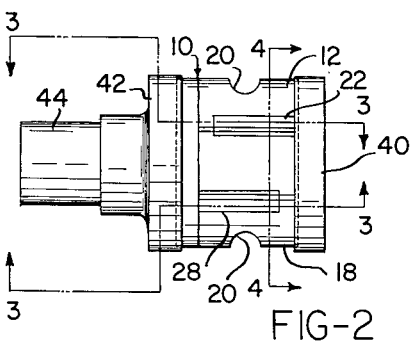
Figure 2 is a side elevational view of the bar and the cast non-magnetic material shown in Figure 1.

Referring to the drawings, the reference character 10 indicates a piece of magnetic material that has been severed from a bar of magnetic material. This piece of magnetic material has been provided with parallel facets 12, 14, 16 and 18. The facets 12, 14, 16 and 18 are preferably machined surfaces, so that all the surfaces are parallel to each other. For convenience, arcuate slots or notches 20 have been formed in the outer margins. The piece 10 is provided with an enlarged center portion 21, best seen in Figure 4 and shown by dotted lines in Figure 1.

Diagonal slots or grooves 22, 24, 26 and 28 have been cut in the zone located between the parallel facets 12, 14, 16 and 18 and the enlarged portion 21. The grooves 22 and 24 have parallel bottoms and the grooves 26 and 28 have parallel bottoms. As best seen in Figure 3, an intermediate portion 30 is diagonally disposed or askew with respect to the longitudinal axis of the original bar. The slots or grooves form rabbets that taper from one end to the other. Furthermore, adjacent grooves taper in opposite directions. The grooves have been cut or formed in a manner such that the pole faces are all askew in the same angular direction with respect to the slots in the armature.

After the grooves have been formed, the piece 10 is placed in a mold having cylindrical cavities into which the ends of the piece 10 project. By pouring non-magnetic material into the two ends of the mold, castings 40 and 42 are formed. The casting 42 is provided with a cylindrical extension 44. This non-magnetic material also fills the grooves 22, 24, 26 and 28. The castings 40 and 42 are machined by any suitable mechanism, as for example, a turret lathe. The centers of the castings and the piece 10 are drilled or machined, so as to provide a hole, this hole dividing the piece 10 into two pole pieces, the pole faces 23 being arranged askew with respect to the longitudinal axis.

The operations of drilling the hole and trimming the piece have been fully described in the copending Stein application Serial No. 471,560 Patent No. 2,935,785. At this time the detailed operations will not be repeated. Suffice to state, that as the hole is drilled or machined through the center of the piece 10, no burr will be formed on the margins of the pole face areas, due to the fact that the cutting instrumentality passes from non-magnetic material into the magnetic material and then again into the non-magnetic material. After the center has been machined out, so as to provide two pole pieces having faces 23 that are arranged askew with respect to the longitudinal axis of the armature mounted in the hole or the bore, the non-magnetic material seated in the grooves may be removed, if desired. By placing permanent magnets 45, shown in Figure 9, each of which is arcuate, against the facets 12, 14, 16 and 18 of the two pole pieces, a magnetic circuit is provided. The magnetic flux linking the armature passes into the armature from the askew pole faces 23.

Instead of using solid bar stock, the magnetic pole pieces may be made from powdered magnetic material that has been molded or preformed and sintered, so as to bind the magnetic material into a unitary structure. In order to facilitate production by the use of a simplified mold, the pole pieces are molded in two parts or halves, as clearly shown in Figure 8, that is, the halves 60 and 62. These two halves are identical, molded from the same mold. Each of these halves is provided with portions that form the pole pieces 64 and 66. The front side of each half has a contour of the finished stator frame. The rear surface lies in a plane with the exception of a recess 63 and a projection 65. By superimposing the two halves back to back, a pair of pole pieces is formed, held in spaced relation by the bridging portions 80 spanning the distance between the poles. The projections 65 are then seated in the recesses 63 to properly align the pole pieces that are welded together, as indicated at 67.

Instead of grooves, rabbets 68 and 70 are used. The two pole pieces 64 and 66 are held together by means of a bridging portion 80 located near one end of the pole pieces. The two halves 60 and 62 are superimposed upon each other, as clearly shown in Figure 5. The angular relation of the rabbets 68 and 70 forms an intermediate portion 72, a portion of which is from one of the pieces and the remaining portion from the other piece.

The portions are askew with respect to the longitudinal axis, so as to form askew faces adjacent the armature.

In the event a two pole motor is to be produced, the two parts or halves 60 and 62 have the ends and the rabbet provided with castings similar to those described in connection with the preferred embodiment. The bridging portions 80 are embedded in the non-magnetic casting on one of the ends. The bridging portions are removed when the hole for the armature is formed. The pole pieces 60 and 62, together with the bridging portion 80, cooperate to form a substantially U-shaped member.

A similar arrangement of poles may also be used in connection with a four pole motor, in which event two additional pieces 160a and 162a are assembled so as to form a cross. However, in this modification, the bridging portion at the end has been omitted and instead, bridging portions 100 and 102 have been used. The face 100a coincides with a plane bisecting the length of the finished pole pieces. Each of the halves 160 and 162, 160a and 162a is provided with recesses and projections 65 similar to those shown in Figure 8. In Figure 5 the two pairs of poles have been shown in an exploded view.

The two pairs of pole pieces, as seen in Figure 5, have been welded together at 67, or at any other suitable place. The two pairs of pole pieces are moved together along the dotted lines, as shown in Figure 5, until the faces of the bridging members 100 and 102 of one pair or set of pole pieces are in contact with the bridging members 100 and 102 of the other pair. The two pairs of pole pieces are then, so to speak, nested together, the total width of members 100 and 102 being equal to the spacing between the pole pieces of one pair, so that when the two pairs are nested together, they are in proper fixed spaced relation with each other. The bridging portions 100 and 102 of one pair of pole pieces may be clamped against the bridging portions 100 and 102 of the other pair of pole pieces, or these bridging portions may be welded together, so as to hold the pole pieces in proper spaced relation.

The four pole pieces are arranged in quadrature, as clearly seen in Figures 7 and 10. The non-magnetic material 90 and 92 is then cast on the two ends, the non-magnetic material filling the rabbets, as clearly seen in the cross sectional view shown in Figure 7. This cross sectional view discloses the non-magnetic core 94. By drilling or machining a hole, so as to remove the core and the extreme inner margins of the four pole pieces, a four pole motor is produced, having all of the poles arranged in askew relation, properly spaced. This drilling or machining operation severs the bridging portions 100 and 102, so as to magnetically separate the two parts forming each pole from the other poles. The pole pieces, after the core has been removed, have their ends fixedly embedded in the end castings 90 and 92. The rotor may be mounted in a manner similar to that disclosed in the copending Stein application Serial No. 471,560.

In Figure 9 of the drawings, permanent magnets have been used. Instead of permanent magnets, these magnets could be electromagnets, that is, the arcuate members could be provided with windings, or notches could be provided in the pole pieces 12 for the reception of field windings. The invention disclosed herein is not dependent upon the particular type or source of flux. In other words, it could be permanent magnets or it could be electromagnets.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:
1. The method of producing a stator for an electric motor from bar stock having parallel facets adjacent each margin, said method including the steps of severing a piece from a bar of ferro-magnetic material, forming angularly disposed channels in said piece of ferro-magnetic material, the channels on one side of the piece cooperating with the channels on the other side of the piece to form askew portions between channels, casting non-magnetic material on the ends of the piece and in all of the channels, removing the material from the center of the cast non-magnetic material and removing the center out to the channels of the piece of magnetic material so as to provide a pair of askew pole faces.

2. The method of manufacturing a stator for use in a motor having permanent magnets radially positioned with respect to the armature, said method including the steps of severing pole stock from a bar of ferro-magnetic material, said pole stock having marginally disposed parallel facets adapted to form seats against which the ends of the permanent magnets abut, forming diagonally disposed grooves, there being one groove adjacent each facet, each groove varying uniformly in depth from one end to the other, grooves opposite each other varying in depth in opposite directions, casting non-ferro-magnetic castings with the pole stock in position so as to embed the ends of the pole stock in the castings, and removing the interconnecting portion of the pole stock intermediate the grooves so as to form askew pole pieces.

3. The method of manufacturing a stator for use in a motor having permanent magnets radially positioned with respect to the armature, said method including the steps of severing pole stock from a bar of ferro-magnetic material, said pole stock having marginally disposed parallel facets adapted to form seats against which the ends of the permanent magnets abut, forming diagonally disposed grooves, there being one groove adjacent each facet, each groove varying uniformly in depth from one end to the other, grooves opposite each other varying in depth in opposite directions, and removing the material intermediate the grooves to provide askew pole faces.

4. The method of producing a stator for an electric motor including the steps of fabricating at least one pair of pole pieces of magnetic material, each pole piece having side faces each consisting of two portions, a major portion lying in a plane parallel to and longitudinally extending with respect to a plane including the armature axis of rotation and a minor portion at the extremity of the pole piece adjacent the armature lying entirely within a plane which intersects any plane including the rotational axis of the armature, casting non-magnetic material on the ends and over the minor portions of the side faces of the pole pieces, removing the material from the center of the cast non-magnetic material and removing the material from the center of the pole pieces outward to the minor portions of the pole pieces so as to provide at least one pair of pole faces askew to the longitudinal axis of the motor.

5. A stator for electrical apparatus having magnetic fields radially positioned with respect to an armature, comprising a body of pre-formed magnetic material having non-magnetic material applied therearound to form a stator frame, a hole formed in said magnetic material to magnetically separate the magnetic body and form the inner surfaces of at least two pole pieces, the lower portion of each pole piece having angularly disposed channels in each side thereof, said channels extending generally in the direction of the longitudinal axis of said stator, the base of said channels being planar and lying entirely within a plane which intersects any plane including the longitudinal axis of the stator, the channel on one side of each pole piece cooperating with the channel on the other side of the pole piece to define therebetween pole faces lying askew the longitudinal axis of the stator.

6. An electric motor including a stator and a rotatable armature, said stator having a plurality of integral pole pieces extending towards the armature, each pole piece consisting of an upper and a lower portion, the polar plane of the upper portion passing through and including the axis of the armature, the polar plane of the lower portion being intersected by the axis of the armature, said lower portion of the pole piece extending the full longitudinal length thereof.

7. An electric motor including a stator and a rotatable armature, said stator having a plurality of integral pole pieces extending towards the armature, each pole piece consisting of an upper and a lower portion, the polar plane of the upper portion passing through and including the axis of the armature, the polar plane of the lower portion being intersected by the axis of the armature, said lower portion of the pole piece extending the full longitudinal length thereof, and electromagnetic means including said pole pieces for generating the magnetic field of said stator.

References Cited in the file of this patent

UNITED STATES PATENTS

| | | |
|---|---|---|
| 1,897,184 | Zopp | Feb. 14, 1933 |
| 2,479,455 | Aronoff | Aug. 16, 1949 |
| 2,683,826 | Staak | July 13, 1954 |

FOREIGN PATENTS

| | | |
|---|---|---|
| 125,375 | Great Britain | June 24, 1920 |
| 510,590 | Germany | Oct. 21, 1930 |
| 525,026 | Great Britain | Aug. 20, 1940 |